United States Patent [19]

McCabe

[11] Patent Number: 5,672,374
[45] Date of Patent: Sep. 30, 1997

[54] PROCESS AND APPARATUS FOR PRODUCING A FOOD PRODUCT

[75] Inventor: Derald L. McCabe, Houston, Tex.

[73] Assignee: Environmental Liquid Reclamation, Inc., Houston, Tex.

[21] Appl. No.: 559,420

[22] Filed: Nov. 15, 1995

[51] Int. Cl.$^6$ .................................. A23K 1/00; A23P 1/00
[52] U.S. Cl. .................. 426/635; 99/472; 99/483; 426/465; 426/511
[58] Field of Search ........................ 426/635, 511, 426/465; 99/467, 472, 483, 484

[56] References Cited

U.S. PATENT DOCUMENTS

| | | | |
|---|---|---|---|
| 3,214,352 | 10/1965 | Wells | 202/187 |
| 3,736,234 | 5/1973 | Miyamoto | 202/185 R |
| 4,686,009 | 8/1987 | McCabe | 202/176 |
| 4,841,850 | 6/1989 | Friedmann | 99/472 |
| 5,346,714 | 9/1994 | Peters | 426/635 |

*Primary Examiner*—George Yeung
*Attorney, Agent, or Firm*—Tobor & Goldstein, L.L.P.

[57] ABSTRACT

A process and apparatus for producing a food product from a waste slurry of water and solid organic material from a cooking process and/or food treatment facility utilizes an evaporator to evaporate water out of the waste slurry to produce a food product and pure water. A portion of the slurry is recirculated through the evaporator.

31 Claims, 6 Drawing Sheets

PROCESS AND APPARATUS FOR PRODUCING A FOOD PRODUCT

BACKGROUND OF THE INVENTION

1. FIELD OF THE INVENTION

The invention relates to a process and apparatus for producing a food product from a waste slurry of water and solid organic material from a cooking process facility, and in particular for producing a food product which may be fed to livestock or pets, such as cattle, horses, hogs, sheep, dogs, cats and chickens.

2. DESCRIPTION OF THE PRIOR ART

In conventional cooking processes for various foods, which are cooked in water at a cooking process facility or plant, an undesired by-product from such cooking processes is a waste slurry of the water that was used to cook the food product and solid organic materials. For example, in the conventional cooking process for vegetables at a vegetable canning plant, the vegetable is cooked in water, and a waste slurry comprised of water and solid organic material, such as vegetable solids, starches and/or sugars results from the cooking process. Examples of various vegetables cooked in water, which produce such a waste slurry include, but are not limited to, tomatoes, beans, peas, corn, potatoes, and soybeans.

Many grain food products are also cooked in water before being packaged for use by a consumer of such grain products, such grain products including, but not limited to, rice and wheat. The waste slurry from such cooking process typically includes, in the case of rice, process liquid in which the rice was cooked, or water, and solid organic materials, such as rice starch, rice sugars, and rice solids, such as rice kernels and pieces thereof. Similarly, various types of fruits are processed with water to make various types of juices, ades, and punches, including, but not limited to, oranges, lemons, apples, and grapes. The waste slurry from such food processing facilities may include water, fruit pulp, and fruit sugars, or fructose. Additionally, various types of meat products are par-boiled in water, and the meat processing facility produces an undesirable by-product of a waste slurry of water and small pieces of meat and other meat components resulting from the par-boiling process.

All of the foregoing described cooking or food processing facilities have been faced with a large problem in handling such waste slurries of water and solid organic materials. At best, some waste slurries, have been accepted by some farmers, who use the waste slurry as an organic fertilizer by tilling it into the soil. Although there is some use made of the waste slurry, the company operating the cooking process facility must bear the cost of the treatment and transportation of the waste slurry to the farming facility, which generally does not pay for the waste slurry it uses as an organic fertilizer. Typically, the operator of a cooking process facility must construct its own sewage treatment plant for the treatment of the waste slurry, thereby incurring additional costs associated with the production of its processed food product, or the operator of the cooking process facility will pay fees for processing its waste slurry by a pre-existing, privately owned or government owned sewage treatment plant to dispose of the waste slurry. Such sewage treatment plants could include a biological remediation pond, and the operator of the cooking process facility pays the owner of the sewage treatment plant for each gallon of waste slurry treated in the sewage treatment plant or biological remediation pond. Such treatment of the waste slurry is necessitated by various federal, state, and local regulations which classify the waste slurries as either containing BOD (Biological Oxygen Demand) materials and/or COD (Chemical Oxygen Demand) materials.

It is believed that some operators of cooking process/food treatment facilities have tried to use conventional methods of water purification techniques to treat their waste slurries, such as reverse osmosis and ultra-filtration equipment. Such techniques are believed to have been unsuccessful and unacceptable for use on a commercial scale because of the large quantity of waste slurry which must be treated and the inherent problems associated with reverse osmosis and ultra-filtration techniques when used to treat water containing solid organic materials, rather than treat water containing undesired inorganic materials. Additionally, the cost of such conventional equipment, for use with a large scale cooking process facility, can be quite expensive. Additionally, with all the foregoing techniques for treating waste slurries from cooking process or food treatment facilities, there has been no useful product, such as a food product, which results from the treatment of the waste slurry.

Accordingly, prior to the development of the present invention, there has been no process or apparatus for producing a food product from a waste slurry of water and solid organic material from a cooking process facility which: produces a food product which can be used by, and/or sold to, farmers and/or ranchers as a food product for feeding livestock or pets; is efficient and economical to manufacture and use; does not require the waste slurry to be treated in a sewage treatment plant; is environmentally "friendly"; separates the water from the waste slurry and purifies it for reuse in the cooking process facility; and is capable of efficiently and economically treating a large volume of waste slurry from a cooking process facility. Therefore, the art has sought a process and apparatus for producing a food product from a waste slurry of water and solid organic material from a cooking process facility which: produces a useful food product from the waste slurry which may be used by, and/or sold to, farmers and ranchers for use as a food product for livestock or pets; is efficient and economical to manufacture and use; does not require the use of a sewage treatment plant for the waste slurry; is environmentally "friendly"; is capable of converting, efficiently and economically, a large volume of waste slurry into a food product; and provides clean and pure water which may be reused in the cooking process facility.

SUMMARY OF THE INVENTION

In accordance with the invention, the foregoing advantages have been achieved through the present process for producing a food product from a waste slurry of water and solid organic material from a cooking process facility. The present invention includes the steps of: feeding the waste slurry into a degasser, having first and second ends; applying a vacuum to the waste slurry in the degasser to degas the waste slurry; feeding the degassed slurry into an evaporator, having first and second ends; feeding steam into the evaporator; heating the degassed slurry with the steam to evaporate the water from the degassed slurry to initially separate a portion of the water from the solid organic materials; recirculating a portion of the degassed slurry through the evaporator to substantially separate the water from the solid organic material; removing the separated water from the evaporator; and removing the solid organic material from the evaporator, the solid organic material having a sludge-like consistency and being suitable for use as a food product.

A feature of the present invention may include the steps of providing the evaporator with a plurality of tubes, the tubes having first and second ends, the tubes extending from a first location spaced from the first end of the evaporator to a second location spaced from the second end of the evaporator; passing the degassed slurry through the tubes; and the portion of the degassed slurry which is recirculated is pumped into the second end of the evaporator and into the second ends of the tubes. Another feature of the present invention may include the steps of feeding the steam into the first end of the evaporator and flowing the steam around the plurality of tubes to heat the degassed slurry to cause a portion of the water and the degassed slurry to form steam which passes through the tubes. An additional feature of the present invention may include the step of disposing, within the first end of the evaporator proximate the first ends of the tubes, a means for deflecting the steam and degassed slurry, exiting from the first ends of the tubes, in a direction toward the second ends of the tubes.

Another feature of the present invention may include the step of disposing proximate the first ends of the tubes a means for separating water from the steam formed from the degassed slurry exiting the first ends of the tubes. A further feature of the present invention may include the steps of withdrawing stem from the evaporator and passing the steam through a blower to feed steam into the first end of the evaporator. An additional feature of the present invention may include the steps of condensing a portion of the steam to form water and removing the water from the evaporator at a location proximate the second end of the evaporator. An additional feature of the present invention may include the steps of evaporating the water from the degassed slurry to form steam, and condensing the steam to form the separated water.

In accordance with another aspect of the present invention, the foregoing advantages have also been achieved through the present apparatus for producing a food product from a waste slurry of water and solid organic material from a cooking process facility. This aspect of the present invention comprises: a degasser; a means for applying a vacuum to the degasser to degas the waste slurry; means for feeding the waste slurry into the degasser; an evaporator, having first and second ends, including a means for feeding steam into the evaporator, to evaporate the water from the degassed slurry to substantially separate the water from the solid organic materials; means for feeding the degassed slurry into the evaporator; means for recirculating a portion of the degassed slurry through the evaporator, the recirculation means being associated with the evaporator; means for removing the solid organic material from the evaporator, the solid organic material having a sludge-like consistency and being suitable for use as a food product; and means for removing the separated water from the evaporator.

A feature of the present invention is that the evaporator may include an elongated evaporator tank having first and second ends, and an inner wall surface, with a plurality of tubes disposed within the evaporator tank in a spaced relationship from each other and from the inner wall surface of the evaporator tank, the tubes extending from a first location spaced from the first end of the evaporator tank to a second location spaced from the second end of the evaporator tank, the degassed slurry passing through the tubes. An additional feature of the present invention may include a first plate member disposed within the evaporator tank adjacent the first ends of the plurality of tubes in a sealed relationship with the inner wall surface of the evaporator tank and an outer wall surface of each tube; a second plate member being disposed within the evaporator tank adjacent the second ends of the plurality of tubes in a sealed relationship with the inner wall surface of the evaporator tank and the outer wall surface of each tube, whereby the degassed slurry may only pass through the evaporator tank from its first end to its second end by passing through the plurality of tubes.

A further feature of the present invention may include the means for feeding steam into the evaporator being disposed in fluid communication with a first sealed space, having first and second ends, and defined by the inner wall surface of the evaporator tank, the outer wall surfaces of the tubes and the first and second plate members, whereby the steam may flow within the first sealed space and around the outer wall surfaces of the tubes to heat the degassed slurry as the degassed slurry passes through the tubes, to cause a portion of the water and the degassed slurry to form steam which passes through the tubes.

Another feature of the present invention is that a second sealed space may be disposed at the first end of the evaporator tank and is defined by the inner wall surface of the evaporator tank and the first plate member; a third sealed space is disposed at the second end of the evaporator tank and is defined by the inner wall surfaces of the evaporator tank and the second plate member; and the means for recirculating a portion of the degassed slurry is a first fluid passageway in fluid communication with the second and third sealed spaces, whereby a portion of the degassed slurry, after exiting from the first ends of the tubes into the second sealed space, may be recirculated into the third sealed space and then again flow into the second ends of the tubes and flow through the tubes to the first ends of the tubes. Another feature of the present invention is that the means for removing the separated water from the evaporator may be a third fluid passageway in fluid communication with the first sealed space proximate the second end of the first sealed space, the steam within the first sealed space condensing to water, upon the inner wall surface of the evaporator tank, which flows outwardly from the evaporator tank into the third fluid passageway.

The process and apparatus for producing a food product from a waste slurry of water and solid organic material from a cooking process facility of the present invention, when compared with previously proposed prior art processes and apparatus, have the advantages of: producing a food product which may be used by, and/or sold to, farmers and ranchers for a livestock feed; is efficient and economical to manufacture and use; does not require the use of a sewage plant to treat the waste slurry; is environmentally friendly; is capable of treating, economically and efficiently, a large volume of waste slurry from a cooking process facility; and produces clean, pure water, for reuse in the cooking process facility.

While the invention will be described in connection with the preferred embodiment, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF THE INVENTION

With reference to FIGS. 1–4, the apparatus 11 of the present invention for producing a food product from a waste slurry of water and solid organic material from a cooking process facility 36 (FIG. 5) generally comprises a degasser 12; a means for applying a vacuum 13 to the degasser 12; a means for feeding 14 the waste slurry into the degasser 12; an evaporator 15, including a means for feeding steam 16 into the evaporator 15; a means for feeding 17 (FIG. 2) degassed slurry into the evaporator 15; a means for recirculating 18 a portion of the degassed slurry through the evaporator 15; means for removing 19 (FIGS. 2 and 3) solid organic material from the evaporator 15; and means for removing 20 (FIG. 3), separated water from the evaporator 15.

Figure 5:
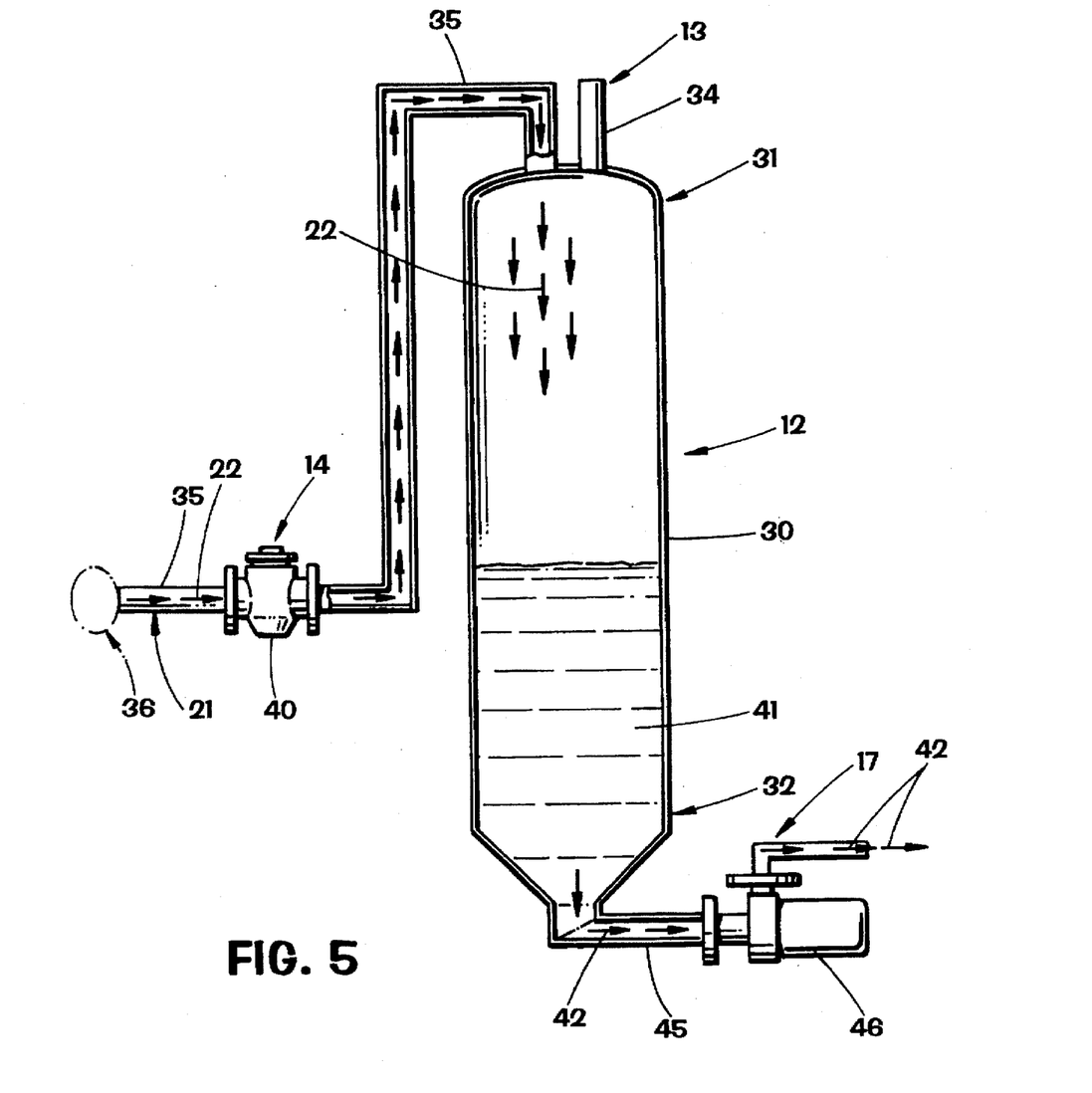
FIG. 5 is a partial cross-sectional view of a degasser tank in accordance with the present invention.

As previously described, the apparatus 11 of the present invention is used to produce a food product 110 (FIGS. 6 and 9) from a waste slurry 21 (FIG. 5), indicated by arrows 22, of water and solid organic material from a cooking process, or food treatment, facility 36 (FIG. 5). As previously described, the waste slurry 21 generally includes the cooking process liquid, or water, and solid organic materials, such as pieces of the cooked vegetable, grain, or fruit, and other solid organic materials such as starches, sugars or fruit pulp, etc. As will be hereinafter described in greater detail, the food product 110 produced by apparatus 11 will be comprised of the solid organic material removed from waste slurry 21, and the food product will have a sludge-like consistency and viscosity, and is suitable for use as a food product for livestock or pets, such as cattle, hogs, horses, chickens, dogs, cats, etc.

Still with reference to FIGS. 1–4, the various components of apparatus 11 are mounted on a base member, or platform, 23 and an upstanding frame 24, including a ladder 25, topdeck 26, and guardrail 27 are provided. These components 23–27 may be made of any suitable material having the requisite strength characteristics to support the various components of apparatus 11, such as structural steel members, which are assembled in a conventional manner. As will be hereinafter described in greater detail, the various components of apparatus 11, as is conventional in the food processing industry, are primarily manufactured from conventional stainless steel, which provides the requisite strength necessary to construct the various components, as well as provides for proper sanitary conditions for production of a food product.

Figure 1:
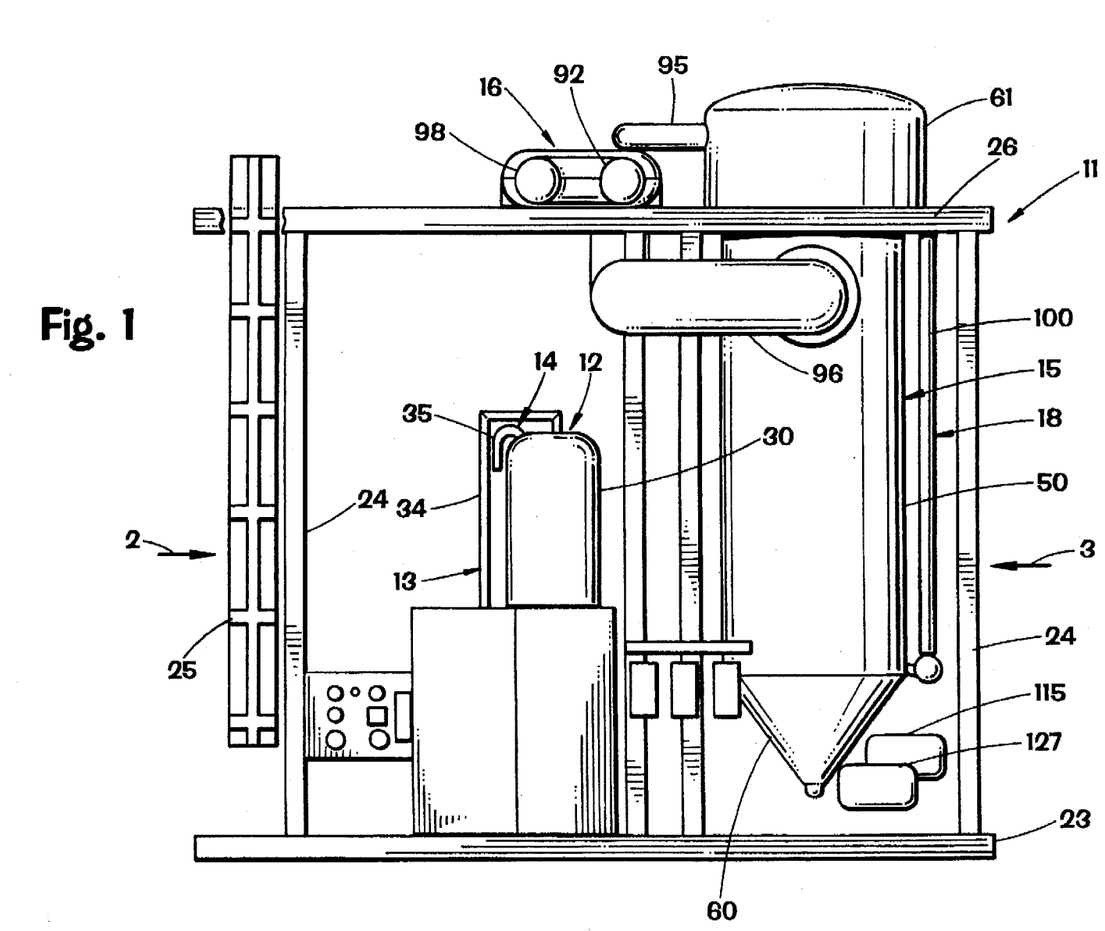
FIG. 1 is a front view of an apparatus for producing a food product from a waste slurry of water and solid organic material from a cooking process facility in accordance with the present invention.

With reference to FIGS. 1 and 5, degasser 12 preferably includes a degasser tank 30 having first and second, or upper and lower, ends 31, 32 and is of conventional construction. Preferably, degasser tank 30 is manufactured from a stainless steel material, and has a general circular cross-sectional configuration and is of a generally cylindrical elongated configuration. It will of course be apparent to one of ordinary skill in the art, that the circular cross-sectional configuration of degasser tank 30 is only preferred, and that of course other cross-sectional configurations could be readily utilized. The means for applying 13 a vacuum to the degasser tank 30 may be a conventional vacuum pump 33 (FIG. 2) in fluid communication with the first end 31 of evaporator tank 30 via a conventional type, or fluid passageway, 34. The means for feeding 14 the waste slurry 21, as indicated by arrows 22, into the degasser tank 30 is a conventional feed pipe, or fluid passageway, 35 which is in fluid communication with the food processing facility shown schematically at 36 in FIG. 5, and with the upper end 31 of degasser tank 30. Waste slurry supply pipe 35 may be directly connected to a pipe (not shown) in direct communication with the cooking process, or food treatment, facility 36, or alternatively the waste slurry may be stored by the cooking process facility 36 in a conventional holding tank (not shown), and the holding tank is in fluid communication with the waste slurry supply line 35. A solenoid valve 40, of conventional construction, may be disposed in waste slurry supply line 35 to control the flow of waste slurry 21, 22 into degasser tank 30. Upon operation of vacuum pump 33, a vacuum is exerted within degasser tank 30, which vacuum serves to draw, or suck, into degasser tank 30 the waste slurry 21 from waste slurry feed line 35. The vacuum applied to degasser tank 30, by vacuum pump 33 and vacuum line 34, also serves to degas the waste slurry 21 by withdrawing through the vacuum line 34 atmospheric air and any atmospheric contamination present in waste slurry 21. Degassing means 12 thus removes any gaseous hydrogen, oxygen and/or nitrogen and other gasses from the waste slurry 21, whereby the second end 32 of degasser tank becomes filled with a degassed slurry 41 comprised of water and solid organic materials, as previously described. The means for feeding 17 the degassed slurry 41, as indicated by arrows 42, preferably includes a pipe 45 in fluid communication between the second, or lower, end 32 of degasser tank 30 and evaporator 15, and a degassed slurry feed pump 46 of conventional construction is disposed in pipe 45, in fluid communication therewith. When it is desired to feed degassed slurry 41 into evaporator 15, a conventional control circuit initiates the operation of degassed slurry feed pump 46 to pump, or feed, degassed slurry 41 into evaporator 15. Evaporator 15 is preferably provided with a conventional fluid level sensor 130 (FIG. 4) which through conventional circuitry operates degassed slurry feed pump 46.

Figure 2:
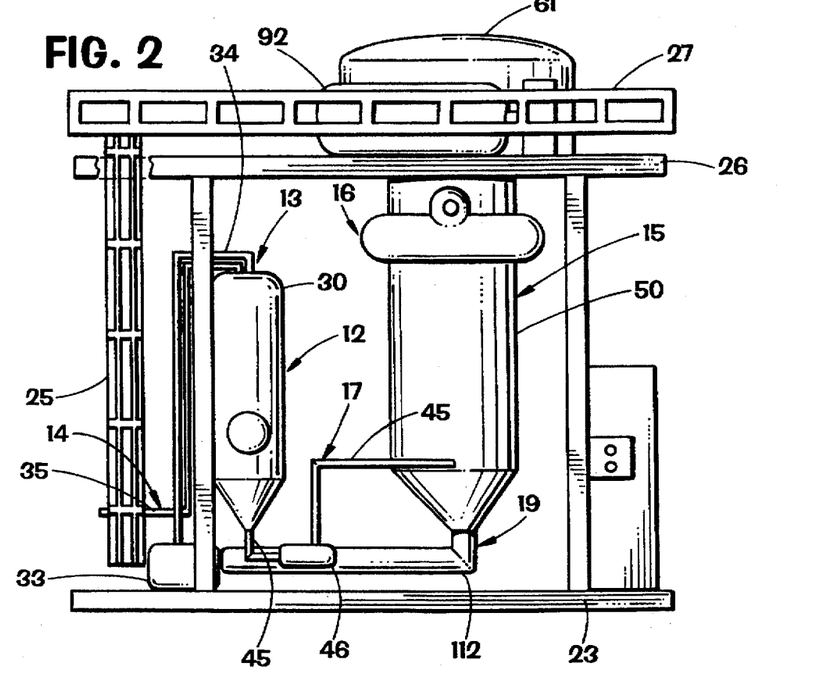
FIG. 2 is a side view of the apparatus of FIG. 1 in the direction of arrow 2 of FIG. 1.
Figure 6:
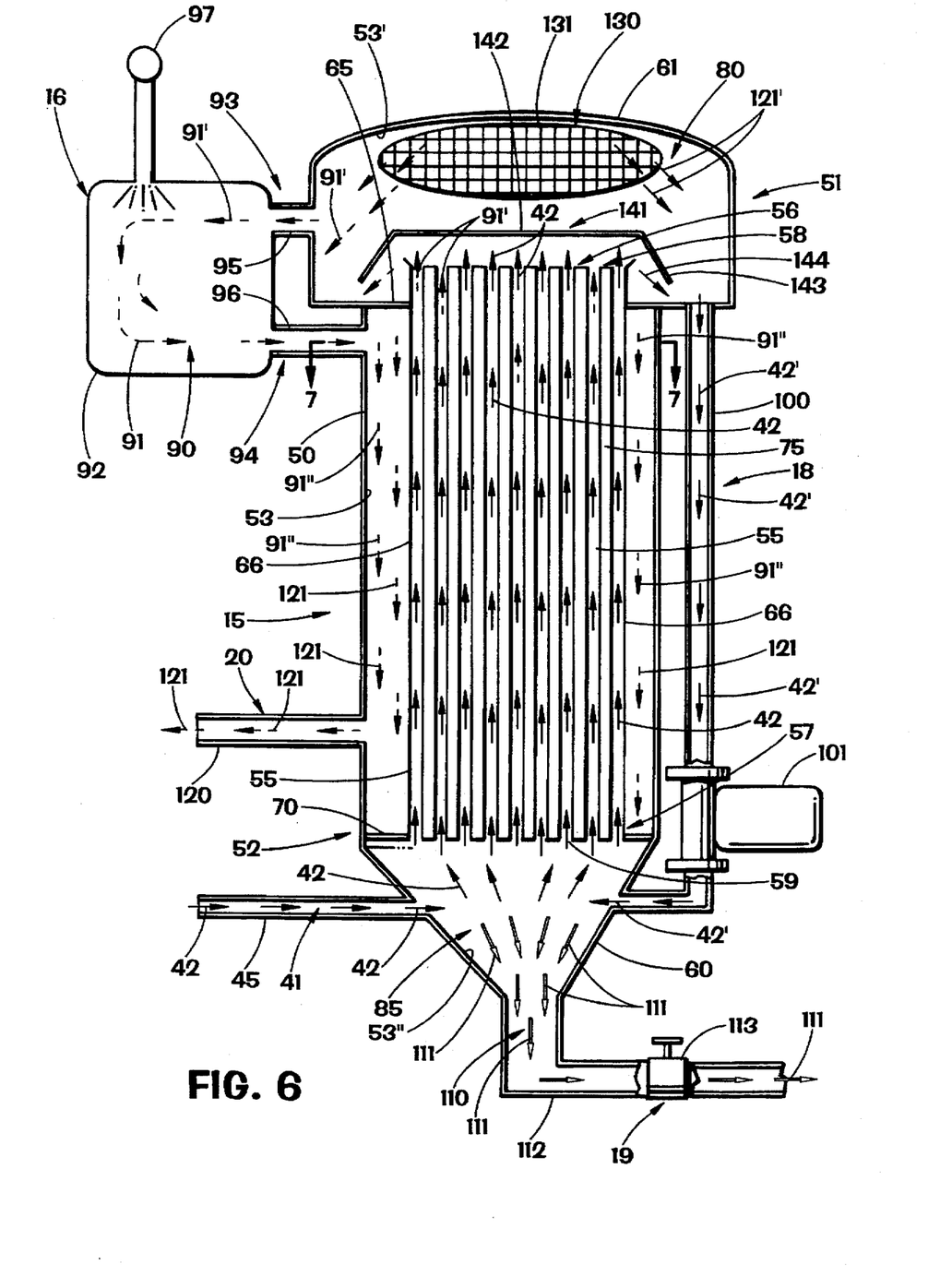
FIG. 6 is a partial cross-sectional view of an evaporator of the present invention, taken along line 6—6 of FIG. 4.
Figure 7:
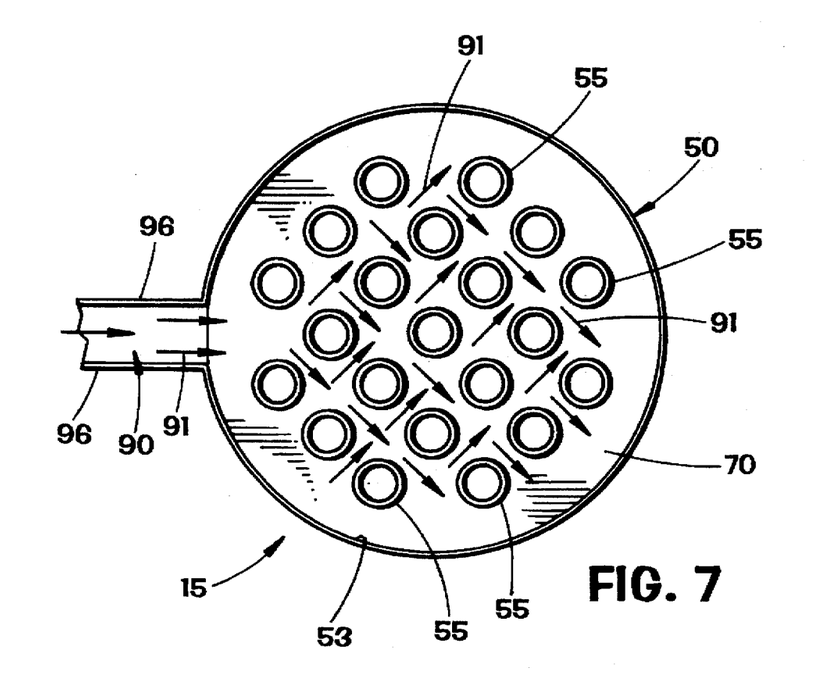
FIG. 7 is a partial cross-sectional view of the evaporator of FIG. 6, taken along line 7—7 of FIG. 6.

With reference to FIGS. 1–3 and FIG. 6, the construction and operation of evaporator 15 will be described. Evaporator 15 generally includes an elongated evaporator tank 50 having first and second, or upper and lower, ends 51, 52 and an inner wall surface 53. As seen in FIG. 7, evaporator, or boiler, tank 50 has a generally circular cross-sectional configuration and a generally elongated cylindrical configuration. Evaporator tank 50 is preferably manufactured of a suitable stainless steel material as previously described. It will be apparent to one of ordinary skill in the art that the cross-sectional configuration and elongated cylindrical configuration of evaporator tank 50 is only preferred, and that other cross-sectional configurations and general configurations could be utilized. As seen in FIGS. 2 and 6, the degassed slurry supply pipe 45 containing the degassed slurry 41 is generally in fluid communication with the second, or lower, end 52 of evaporator tank 50. A plurality of tubes, or evaporator tubes, 55 are disposed within the evaporator tank 50 in a spaced relationship from each other and from the inner wall surface 53 of the evaporator tank 50. As seen in FIG. 6, the plurality of tubes 55 generally extend from a first location 56 spaced from the first end 51 of the evaporator tank 50 to a second location 57 spaced from the second end 52 of the evaporator tank 50. Preferably, the plurality of tubes, or evaporator tubes, 55 extend substantially parallel with the longitudinal axis of evaporator tank 50, and the plurality of tubes 55 are formed of a stainless steel material. As shown in FIG. 6, as designated by arrows 42, the degassed slurry passes through the plurality of tubes 55 in a direction from the second end 52 to the first end 51 of evaporator tank 50, or generally in an upward direction through tubes 55. Tubes 55 each have a first, or upper end 58 and a second, or lower, end 59. The lower end, or second end 52 of evaporator tank 50 is preferably provided with a downwardly extending funnel-shaped closure member 60. The upper end 51 of evaporator tank is preferably provided with an enlarged closure housing 61.

With reference to FIG. 6, evaporator tank 50 is provided with a first plate member 65 disposed within the evaporator tank 50 adjacent the first ends 58 of the plurality of tubes 55 in a sealed relationship with the inner wall surface 53 of the evaporator tank 50 and the outer wall surfaces 66 of each tube 55. A second plate member 70 is preferably disposed within evaporator tank 50 adjacent the second, or lower, ends 59 of tubes 55 in a sealed relationship with the inner wall surface 53 of evaporator tank 50 and the outer wall surfaces 66 of each tube 55. Thus, it is seen that the degassed slurry 41 may only pass, or flow, from the second end, or lower end, 52 of evaporator tank 50 to the first, or upper, end 51 of evaporator tank 50 by flowing through tubes 55. The inner wall surface 53 of evaporator tank 50, the first and second plate members 65, 70, and the outer wall surfaces 66 of tubes 55 define a first sealed space 75 within evaporator tank 50. A second sealed space 80 within evaporator tank 50 at the first, or upper, end 51 of evaporator tank 50 is generally defined by the first plate member 65 and the inner wall surface 53 of evaporator tank 50, whereby the inner wall surface 53' of the closure housing 61 of evaporator tank 50. Primed reference numbers will be used to signify a component having substantially the same structural characteristics of a previously described component having an unprimed reference number. A third sealed space 85 is generally disposed at the second, or lower, end 52 of evaporator tank 50 and is defined by the second plate member 70 and the inner wall surface 53, of evaporator tank 50, or the inner wall surface 53" of the funnel-shaped closure member 60 of evaporator tank 50.

With reference to FIGS. 1, 4, 6, and 7, the means for feeding 16 steam into the evaporator 15, or evaporator tank 50, is disposed in fluid communication with the first sealed space 75 of evaporator tank 50, whereby steam 90, as indicated by arrows 91 (FIG. 7), may flow within the first sealed space 75 and around the outer wall surfaces 66 of the tubes 55 to heat the degassed slurry 41, as the degassed slurry 41 passes through the tubes 55. The heating of the tubes 55 by steam 90, 91 causes a portion of the water in the degassed slurry 41 to form steam as indicated by arrows 91' to pass through tubes 55 into the second sealed space 80 in the first end 51 of evaporator tank 50. Generally, as the degassed slurry 41 passes upwardly through the steam heated tubes 55, some of the water contained in the degassed slurry 41 will be converted to steam 91', and some of the water will remain in its liquid form in the degassed slurry 42. As will be hereinafter described in greater detail in connection with the recirculation means 18, substantially all of the water contained within degassed slurry 41 will be converted to steam upon recirculation of the degassed slurry 42 through evaporator 15.

Figure 4:
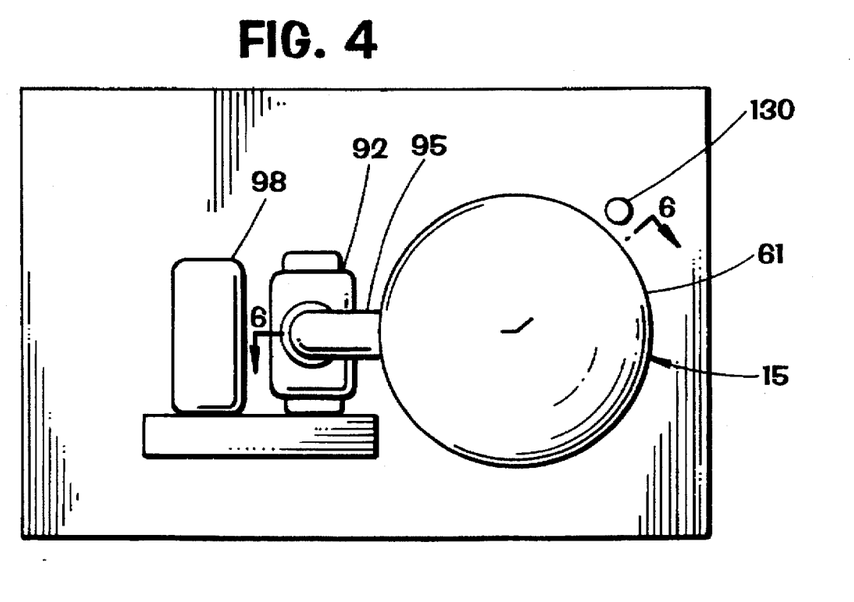
FIG. 4 is a top view of the apparatus of FIG. 1.

Still with reference to FIGS. 1, 4, 6 and 7, the steam feeding means 16 preferably includes a blower, or compressor, 92 of conventional construction having a plurality of rotors (not shown) and an inlet end 93 and an outlet end 94. The blower may be obtained from the M-D Pneumatics Division of Tuthill Corporation of Springfield, Missouri. The inlet end 93 of blower 92 is in fluid communication with the second sealed space 80 of evaporator tank 50, as by a pipe, or fluid passageway 95, and the outlet end 94 of blower 92 is in fluid communication with the first sealed space 75 of evaporator tank 50, as by a pipe, or fluid passageway, 96. The operation of blower 92 creates a vacuum at its inlet end 93, which serves to drawn in the steam 91' which is released from the degassed slurry 41 flowing through tubes 55. The inlet pressure of blower inlet 93 is approximately 7.5 PSIA, and operates at an inlet temperature of approximately 180° F. The outlet end 94 of blower 92 generally operates at atmospheric pressure, or 14.7 PSIA, and the steam 91" exiting from outlet end 94 has a temperature of approximately 212° F. Blower 92 generates steam 91" through the heat of compression of the inlet steam 91', the frictional heat of blower 92, and by a means for spraying 97 the rotors (not shown) of blower 92 with water to cool the blower rotors and provide additional hot water to the blower 92 to generate steam. As is conventional in the art, the pressure differential between the inlet end 93 and outlet end 94 of blower, or compressor, 92 also serves to provide for the generation of steam 91". The blower 92 is powered by a conventional motor 98 (FIG. 4).

Although the use of blower 92, as previously described, is the preferred embodiment for the steam feeding means 16, it should be understood that other steam feeding means could be utilized, such as other conventional steam generators, or boilers.

With reference to FIGS. 1 and 6, the means for recirculating 18 a portion of the degassed slurry 41 through the evaporator 15, or evaporator tank 50, is preferably a first fluid passageway, or pipe, 100 in fluid communication with the second and third sealed spaces 80, 85 of evaporator tank 50. Preferably, pipe 100 extends vertically alongside, and in a spaced relationship from, evaporator tank 50 and extends from the first end 51 of evaporator tank 50, or from the closure housing 61, to the second end 52 of evaporator tank 50, or the funnel-shaped closure member 60. A conventional recirculation pump 101 is associated with the first fluid passageway 100 to pump a portion of the degassed slurry 41, as indicated by arrows 42' whereby a portion of the degassed slurry 42', after exiting from the first ends 58 of the tubes 55 into the second sealed space 80, may be recirculated into the third sealed space 85 and may then again flow into the second ends 59 of the tubes 55 and again flow through the tubes 55 to the first ends 58 of the tubes 55. In this manner, the recirculated degassed slurry 42' may again be heated by steam 91" to again evaporate water from the degassed slurry 42' to again provide for the release of water from the degassed slurry 42' as steam 91'. Preferably, the recirculation of degassed slurry 42' is a continuous process, whereby substantially all the water present in degassed slurry 42, 42' will be evaporated out as steam 91'. As will be hereinafter described in greater detail, a small quantity of water may be not removed from degassed slurry 42, 42', whereby the ultimate food product will have some water in it in order to provide the food product with a sludge-like consistency and viscosity, so that it may be subsequently handled by apparatus 11 as will be hereinafter described and used as a food product.

Figure 9:
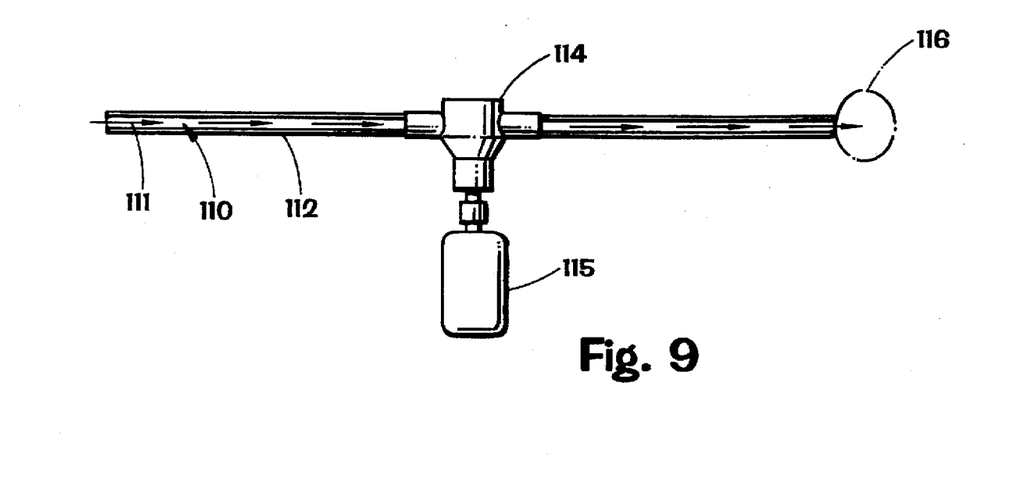
FIG. 9 is a partial cross-sectional view of a portion of the apparatus of FIG. 3.

With reference to FIGS. 1, 6, and 9, the means for removing 19 solid organic material 110 as indicated by arrows 111, from evaporator 15, or evaporator tank 50, is preferably a second fluid passageway, or pipe, 112 in fluid communication with the third sealed space 85. As illustrated in FIG. 6, pipe 112 is preferably disposed at the second end 52 of evaporator tank 50 beneath funnel shaped closure member 60. As the degassed slurry 42, 42' is heated and passes upwardly through tubes 55, the heavier solid organic material 111 being recirculated by recirculation means 18 will fall downwardly into funnel-shaped closure member 60, and then into pipe 112. Pipe 112 may be provided with a suitable, conventional gate valve 113 to control the flow of the solid organic 111 material through pipe 112. A conventional pump 114, operated by a conventional pump motor 115 may be disposed in pipe 112 to pump the solid organic material 110 through pipe 112. The solid organic material, now having a sludge-like consistency may be then pumped to a solid organic material storage tank 116 where the solid organic material, or food product, 110 may be stored until it is shipped to a farmer or rancher for use as a food product. Alternatively, the solid organic material, or food product, 110 may be directly pumped into a tanker truck (not shown), railroad tank car (not shown), or into conventional packaging equipment (not shown), for packaging the solid organic material, or food product, 110 for subsequent use. A suitable pump 114 may be a Rotan Series internal gear pump of Bornemann Pumps, Inc.

Figure 3:
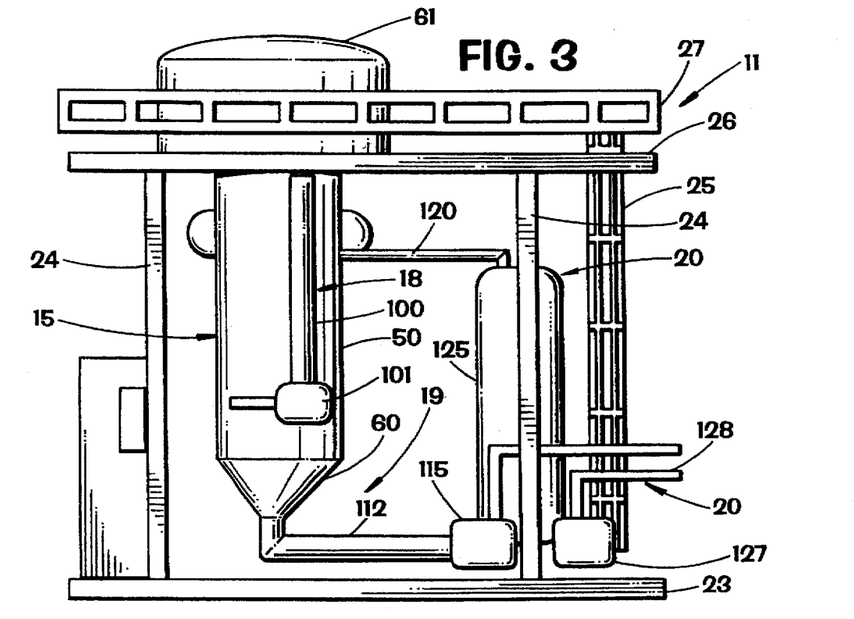
FIG. 3 is a side view of the apparatus of FIG. 1 in the direction of arrow 3 of FIG. 1.
Figure 8:
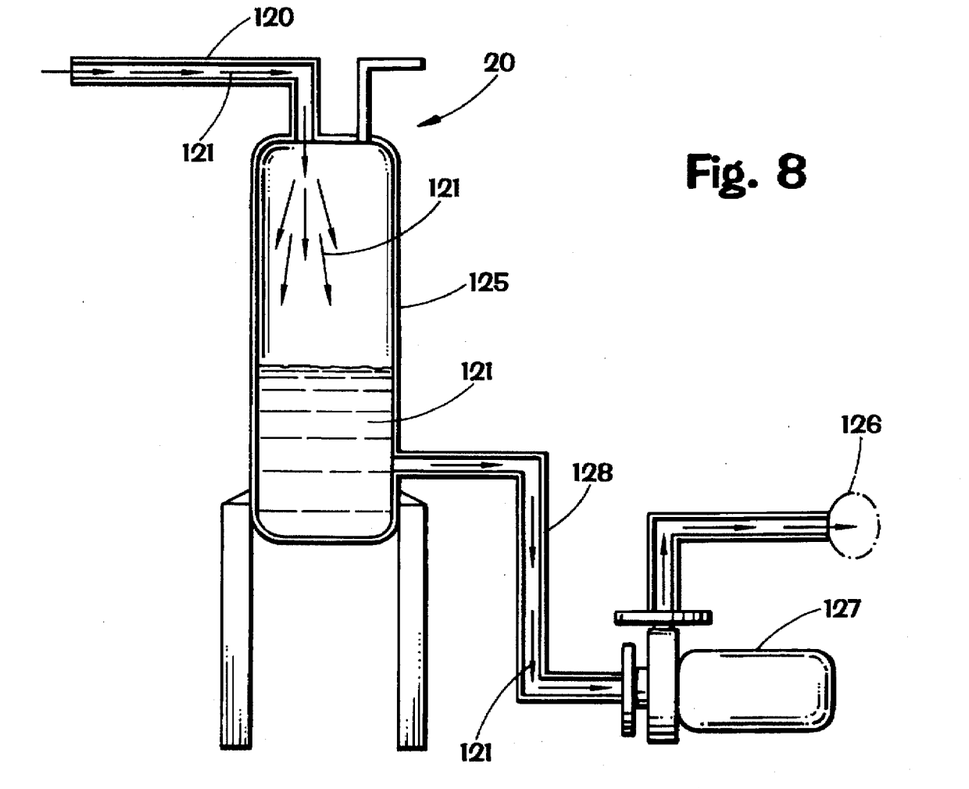
FIG. 8 is a partial cross-sectional view of a clean water tank illustrated in FIG. 3.

With reference to FIGS. 3, 6, and 8, the means for removing 20 the separated water from the evaporator 15, or evaporator tank 50, includes a third fluid passageway, or pipe, 120 in fluid communication with the first sealed space 75 within evaporator tank 50, the pipe 120 being disposed proximate the second end 52 of evaporator tank 50. The separated water, indicated by arrows 121 is formed by the condensation of steam 91" condensing upon the inner wall surface 53 of evaporator tank 50 as the steam 91" flows around tubes 55 in a generally downward direction. As steam 91" passes downwardly and condenses upon the inner wall surface 53 of evaporator tank 50, it is withdrawn from evaporator tank 50 and passes through pipe 120 into a pure water tank, or holding tank, 125. Tank 125 holds the pure water 121 until it is pumped into a fresh water tank shown schematically at 126 by a water pump 127 disposed in fluid communication, as by a pipe 128, with holding tank 125 and fresh water tank 126. The pure, or fresh, water 121 may be reused within the cooking process and/or food treatment facility or may be used for other purposes. Another pump 129 may be associated with the holding tank 125 which pump 129 is in fluid communication with the blower 92 or the means for spraying 97 the rotor with water to cool the blower rotors, as previously described.

Preferably, as illustrated in FIG. 6, a means for separating 130 water from steam present in the second sealed space 80 of evaporator tank 50 is disposed within the second sealed space 80 in the first end 51 of evaporator tank 50, or within the upper end of the closure housing 61. The water separation means acts to separate any water particles entrained in the steam 91' present in the second sealed space 80. Preferably, the water separation means 130 is a mesh screen 131, which may be a stainless steel wool type mesh disposed in the upper end of the closure housing 61 of evaporator tank 50. Other water separation means, or mistseparator means, 130 could be utilized, such as porous materials such as sintered metal, porcelain, and others. Water separation means 130 is constructed so as to prevent particles of water from entering the inlet end 93 of blower 92. As illustrated by arrows 121', any water particles removed by water separation means 130 are directed downwardly into closure housing 61, or second sealed space 80, and such water particles are recirculated by circulation means 18 as previously described, until such water particles are evaporated out of the degassed slurry 41' as steam 91'.

Still with reference to FIG. 6, a means for deflecting 140 steam 91' and degassed slurry 42, as it exits the first ends 58 of tubes 55 into the second sealed space 80, in a direction toward the second ends 59 of tubes 55 may be disposed in the second sealed space 80 in the upper, or first end, 51 of evaporator tank 50. Preferably, the deflecting means 140 is a stainless steel baffle plate 141 disposed in the second sealed space 80 adjacent, and overlying, the first ends, or upper ends, 58 of tubes 55. The baffle plate member 141 may have a generally circular-shaped base plate 142 which overlies all of the tubes 55, and a downwardly projecting, and outwardly flaring, annular wall member 143 connected to the base member 142, whereby as the steam 91' and degassed slurry 42 exit the first ends 58 of tubes 55, the steam 91' and degassed slurry 42 will contact the baffle plate 141 and be deflected downwardly as indicated by arrows 144. A portion of the degassed slurry 42 will be drawn into the recirculation means 18, whereas the steam 91' will tend to rise upwardly within the second sealed space 80 into contact with the water separation means 130, as previously described.

It is to be understood that the invention is not limited to the exact details of construction, operation, exact materials or embodiment shown and described, as obvious modifications and equivalents will be apparent to one skilled in the art. For example, the cross-sectional configuration of the various components could have different shapes, and the tubes in the evaporator tank could have a helical or serpentine configuration. Additionally, although the longitudinal axes of the various components are illustrated to be generally disposed substantially perpendicular to the base member 23, the various components could be disposed with their longitudinal axes being disposed substantially parallel with the base member 23 of the apparatus. Accordingly, the invention is therefore to be limited only by the scope of the appended claims.

I claim:

1. A process for producing a food product from a waste slurry of water and solid organic material from a cooking process facility, comprising the steps of:

(a) feeding the waste slurry into a degasser, having first and second ends;

(b) applying a vacuum to the waste slurry in the degasser to degas the waste slurry;

(c) feeding the degassed slurry into an evaporator, having first and second ends;

(d) feeding steam into the evaporator;

(e) heating the degassed slurry with the steam to evaporate the water from the degassed slurry to initially separate a portion of the water from the solid organic material;

(f) recirculating a portion of the degassed slurry through the evaporator to substantially separate the water from the solid organic material;

(g) removing the separated water from the evaporator; and (h) removing the solid organic material from the evaporator, the solid organic material having a sludge-like, consistency and being suitable for use as a food product.

2. The process of claim 1, wherein the waste slurry is fed into the degasser by the vacuum, applied to the degasser, drawing the waste slurry into the degasser.

3. The process of claim 1, wherein the waste slurry is fed into the first end of the degasser and the degassed slurry is fed into the evaporator by removing the degassed slurry from the second end of the degasser.

4. The process of claim 3, wherein the degassed slurry is fed into the second end of the evaporator, and the steam is fed into the first end of the evaporator.

5. The process of claim 1, wherein the step of recirculating the portion of the degassed slurry through the evaporator is accomplished by pumping the portion of degassed slurry from the first end of the evaporator and into the second end of the evaporator.

6. The process of claim 5, including the steps of providing the evaporator with a plurality of tubes, the tubes having first and second ends, the tubes extending from a first location spaced from the first end of the evaporator to a second location spaced from the second end of the evaporator; passing the degassed slurry through the tubes; and the portion of the degassed slurry which is recirculated is pumped into the second end of the evaporator and into the second ends of the tubes.

7. The process of claim 6, including the steps of feeding the steam into the first end of the evaporator and flowing the steam around the plurality of tubes to heat the degassed slurry to cause a portion of the water in the degassed slurry to form steam which passes through the tubes.

8. The process of claim 7, including the step of disposing, within the first end of the evaporator proximate the first ends of the tubes, a means for deflecting the steam and degassed slurry, exiting from the first ends of the tubes, in a direction toward the second ends of the tubes.

9. The process of claim 7, including the step of disposing proximate the first ends of the tubes a means for separating water from the steam formed from the degassed slurry exiting the first ends of the tubes.

10. The process of claim 1, including the steps of providing the evaporator with a plurality of tubes, the tubes extending from the first end of the evaporator to the second end of the evaporator; and passing the degassed slurry through the tubes.

11. The process of claim 10, including the steps of feeding the steam into the first end of the evaporator and flowing the steam around the plurality of tubes to heat the degassed slurry to cause a portion of the water in the degassed slurry to form steam which passes through the tubes.

12. The process of claim 1, including the steps of withdrawing steam from the evaporator and passing the steam through a blower to feed steam into the first end of the evaporator.

13. The process of claim 12, including the steps of condensing a portion of the steam to form water and removing the water from the evaporator at a location proximate the second end of the evaporator.

14. The process of claim 1, including the steps of evaporating the water from the degassed slurry to form steam, and condensing the steam to form the separated water.

15. An apparatus for producing a food product from a waste slurry of water and solid organic material from a cooking process facility, comprising:

(a) a degasser;

(b) a means for applying a vacuum to the degasser to degas the waste slurry;

(c) means for feeding the waste slurry into the degasser;

(d) an evaporator, having first and second ends, including a means for feeding steam into the evaporator, to evaporate the water from the degassed slurry to substantially separate the water from the solid organic material;

(e) means for feeding the degassed slurry into the evaporator;

(f) means for recirculating a portion of the degassed slurry through the evaporator, the recirculation means being associated with the evaporator;

(g) means for removing the solid organic material from the evaporator, the solid organic material having a sludge-like consistency and being suitable for use as a food product; and (h) means for removing the separated water from the evaporator.

16. The apparatus of claim 15, wherein the degasser is a degasser tank having first and second ends; and the means for feeding the waste slurry into the degasser includes a waste slurry supply pipe which is disposed in fluid communication with the first end of the degasser tank; and the means for applying a vacuum to the degasser is a vacuum pump in fluid communication with the degasser, the vacuum pump drawing the waste slurry into the degasser tank.

17. The apparatus of claim 15, wherein the evaporator includes an elongated evaporator tank having first and second ends, and an inner wall surface, with a plurality of tubes disposed within the evaporator tank in a spaced relationship from each other and from the inner wall surface of the evaporator tank, the tubes extending from a first location spaced from the first end of the evaporator tank to a second location spaced from the second end of the evaporator tank, the degassed slurry passing through the tubes.

18. The apparatus of claim 17, wherein a first plate member is disposed within the evaporator tank adjacent the first ends of the plurality of tubes in a sealed relationship with the inner wall surface of the evaporator tank and an outer wall surface of each tube; a second plate member is disposed within the evaporator tank adjacent the second ends of the plurality of tubes in a sealed relationship with the inner wall surface of the evaporator tank and the outer wall surface of each tube, whereby the degassed slurry may only pass through the evaporator tank from its first end to its second end by passing through the plurality of tubes.

19. The apparatus of claim 18, wherein the means for feeding steam into the evaporator is disposed in fluid communication with a first sealed space, having first and second ends, and defined by the inner wall surface of the evaporator tank, the outer wall surfaces of the tubes and the first and second plate members, whereby the steam may flow within the first sealed space and around the outer wall surfaces of the tubes to heat the degassed slurry as the degassed slurry passes through the tubes to cause a portion of the water in the degassed slurry to form steam which passes through the tube.

20. The apparatus of claim 19, wherein the means for feeding steam includes a blower in fluid communication with the first sealed space at an outlet end of the blower and in fluid communication with a second sealed space, disposed at the first end of the evaporator tank and defined by the inner wall surface of the evaporator tank and the first plate member, at an inlet end of the blower.

21. The apparatus of claim 20, wherein the blower includes rotors, and the blower has associated therewith a means for spraying the rotors with water to cool the blower rotors and provide additional hot water to the blower to generate steam.

22. The apparatus of claim 20, wherein a means for separating water from steam present in the second sealed space is disposed within the second sealed space in the first end of the evaporator tank.

23. The apparatus of claim 22, wherein the means for separating water is a mesh screen.

24. The apparatus of claim 20, including a means for deflecting steam and degassed slurry, exiting the first ends of tubes into the second sealed space, in a direction toward the second ends of the tubes.

25. The apparatus of claim 24, wherein the deflecting means is a baffle plate disposed in the second sealed space adjacent, and overlying, the first ends of the tubes.

26. The apparatus of claim 19, wherein a second sealed space is disposed at the first end of the evaporator tank and is defined by the inner wall surface of the evaporator tank and the first plate member; a third sealed space is disposed at the second end of the evaporator tank and is defined by the inner wall surface of the evaporator tank and the second plate member; and the means for recirculating a portion of the degassed slurry is a first fluid passageway in fluid communication with the second and third sealed spaces, whereby a portion of the degassed slurry, after exiting from the first ends of the tubes into the second sealed space, may be recirculated into the third sealed space and then again flow into the second ends of the tubes and flow through the tubes to the first ends of the tubes.

27. The apparatus of claim 26, wherein the recirculation means includes a recirculation pump associated with the first fluid passageway.

28. The apparatus of claim 26, wherein the means for removing the solid organic material from the evaporator is a second fluid passageway in fluid communication with the third sealed space.

29. The apparatus of claim 27, wherein a sludge pump is associated with the second fluid passageway, to pump the solid organic material from third sealed space.

30. The apparatus of claim 19, wherein the means for removing the separated water from the evaporator is a third fluid passageway in fluid communication with the first sealed space proximate the second end of the first sealed space, the steam within the second sealed space condensing to water, upon the inner wall surface of the evaporator tank, which water flows outwardly from the evaporator tank into the third fluid passageway.

31. The apparatus of claim 30, wherein the third fluid passageway is in fluid communication with at least one water holding tank and a discharge pump is associated with the third fluid passageway.

\* \* \* \* \*